(12) United States Patent
Vogel

(10) Patent No.: US 7,578,168 B2
(45) Date of Patent: Aug. 25, 2009

(54) INCREASING GAS GAUGE PRESSURE SENSITIVITY USING NOZZLE-FACE SURFACE ROUGHNESS

(75) Inventor: Herman Vogel, Sandy Hook, CT (US)

(73) Assignee: ASML Holding N.V., Veldhoven (NL)

( * ) Notice: Subject to any disclaimer, the term of this patent is extended or adjusted under 35 U.S.C. 154(b) by 39 days.

(21) Appl. No.: 11/769,421

(22) Filed: Jun. 27, 2007

(65) Prior Publication Data
US 2009/0000353 A1 Jan. 1, 2009

(51) Int. Cl.
*G01B 13/08* (2006.01)
(52) U.S. Cl. ............................ 73/37.5
(58) Field of Classification Search ............ 73/37.5, 73/37.6, 36.8
See application file for complete search history.

(56) References Cited

U.S. PATENT DOCUMENTS

| | | | | |
|---|---|---|---|---|
| 2,276,036 A | * | 3/1942 | Hanna et al. | 73/37.7 |
| 2,707,389 A | * | 5/1955 | Fortier | 73/37.5 |
| 2,986,924 A | * | 6/1961 | Becker | 73/37.5 |
| 3,127,764 A | * | 4/1964 | Hudson | 73/37.5 |
| 3,482,433 A | * | 12/1969 | Gladwyn | 73/37.5 |
| 3,495,442 A | * | 2/1970 | Rejsa | 73/37.6 |
| 3,513,688 A | * | 5/1970 | Thibault | 73/37.9 |
| 3,545,256 A | * | 12/1970 | Beeken | 73/37.5 |
| 3,597,961 A | * | 8/1971 | Pinkstaff | 73/37.5 |
| 3,709,027 A | * | 1/1973 | Beeken | 73/37.5 |
| 3,881,357 A | * | 5/1975 | Sahlin | 73/37.5 |
| 3,894,552 A | * | 7/1975 | Bowditch | 137/82 |
| 3,942,556 A | * | 3/1976 | Wojcikowski | 137/804 |
| 4,059,130 A | * | 11/1977 | Cohen | 137/82 |
| 4,090,406 A | * | 5/1978 | Rodder | 73/204.13 |
| 4,142,401 A | * | 3/1979 | Wilson | 73/37.5 |
| 4,203,022 A | * | 5/1980 | Couch et al. | 219/121.56 |
| 4,348,889 A | * | 9/1982 | Haynes et al. | 73/37.7 |

(Continued)

FOREIGN PATENT DOCUMENTS

DE 34 09 165 A1 9/1985

(Continued)

OTHER PUBLICATIONS

Moody, Lewis F., "*Friction Factors for Pipe Flow*," Transactions of the American Society of Mechanical Engineers, 1944, pp. 671-684, vol. 66, The American Society of Mechanical Engineers, New York, NY.

(Continued)

*Primary Examiner*—John Fitzgerald
(74) *Attorney, Agent, or Firm*—Sterne, Kessler, Goldstein & Fox P.L.L.C.

(57) ABSTRACT

A gas gauge for sensing distance to an object includes a gas supply system and a nozzle that supplies the gas from the gas supply system to a space between the nozzle and the object. For example, the gas supply system supplies the gas with a flow rate that corresponds to a flow in a transitional region between laminar flow and turbulent flow. A surface of the nozzle may be roughened so as to increase a friction factor across the surface, which increases gas pressure drop and also a gain of the nozzle. Noise generated by the increased flow rate may be attenuated using one or more strategically placed Helmholtz attenuators and/or snubbers.

30 Claims, 8 Drawing Sheets

U.S. PATENT DOCUMENTS

| | | | | |
|---|---|---|---|---|
| 4,391,127 | A * | 7/1983 | Hawkins | 73/37.7 |
| 4,421,970 | A * | 12/1983 | Couch, Jr. | 219/121.56 |
| 4,458,519 | A * | 7/1984 | Day et al. | 73/37 |
| 4,550,592 | A * | 11/1985 | Dechape | 73/37.5 |
| 4,581,918 | A * | 4/1986 | Duhrin | 73/37.7 |
| 4,607,960 | A * | 8/1986 | Wulff | 374/7 |
| 4,912,410 | A * | 3/1990 | Morley | 324/230 |
| 4,953,388 | A * | 9/1990 | Barada | 73/37.5 |
| 5,022,258 | A * | 6/1991 | Wilson | 73/37.5 |
| 5,298,073 | A | 3/1994 | Wilson | |
| 5,317,898 | A * | 6/1994 | Nemeth | 73/37.7 |
| 5,789,661 | A * | 8/1998 | Fauque et al. | 73/37.5 |
| 6,029,361 | A | 2/2000 | Newman | |
| 6,220,080 | B1 * | 4/2001 | Fauque | 324/662 |
| 6,807,845 | B2 * | 10/2004 | Halbinger et al. | 73/37.5 |
| 7,017,390 | B1 * | 3/2006 | Vogel | 73/37.5 |
| 7,134,321 | B2 * | 11/2006 | Galburt et al. | 73/37.5 |
| 7,140,233 | B2 * | 11/2006 | Vogel | 73/37.5 |
| 2004/0118183 | A1 * | 6/2004 | Gajdeczko et al. | 73/37.5 |
| 2004/0118184 | A1 * | 6/2004 | Violette | 73/37.5 |
| 2005/0044963 | A1 * | 3/2005 | Lyons | 73/861 |

FOREIGN PATENT DOCUMENTS

| | | |
|---|---|---|
| DE | 34 09 168 A1 | 9/1985 |
| EP | 1 431 709 A2 | 6/2004 |
| JP | 57191507 A * | 11/1982 |

OTHER PUBLICATIONS

Novelty Search for Sweden Application No. SE 2008 01129 filed May 9, 2008, 4 pgs.
European Search Report and Written Opinion mailed Sep. 3, 2008 for Application No. 08159163.8-2213, 5 pgs.

* cited by examiner

INCREASING GAS GAUGE PRESSURE SENSITIVITY USING NOZZLE-FACE SURFACE ROUGHNESS

BACKGROUND

1. Field of the Invention

The present invention relates to an apparatus and method for detecting very small distances, and more particularly to proximity sensing.

2. Related Art

Many automated manufacturing processes require the sensing of the distance between a manufacturing tool and the product or material surface being worked. In some situations, such as semiconductor lithography, the distance must be measured with accuracy approaching several nanometers.

The challenges associated with creating a proximity sensor of such accuracy are significant, particularly in the context of lithography systems. In this context, in addition to being non-intrusive and having the ability to precisely detect very small distances, the proximity sensor can not introduce contaminants, cause minute temperature changes, or come in contact with the work-surface, typically a semiconductor wafer. Occurrence of either situation may significantly degrade or ruin the semiconductor quality.

Different types of proximity sensors are available to measure very small distances. Examples of proximity sensors include capacitance and optical gauges. These proximity sensors have serious shortcomings when used in lithography systems because physical properties of materials deposited on wafers may impact the precision of these devices. For example, capacitance gauges, being dependent on the concentration of electric charges, can yield spurious proximity readings in locations where one type of material (e.g., metal) is concentrated. Another class of problems occurs when exotic wafers are made of or contain deposits of non-conductive and/or photosensitive materials, such as Gallium Arsenide (GaAs) and Indium Phosphide (InP). In these cases, capacitance and optical gauges may provide spurious results.

Air gauge sensors typically emit a dehydrated, filtered air flow onto a surface (e.g., the silicon wafer) and then measure its back pressure to determine distance between the measurement nozzle and that surface. More sensitive air gauge sensors use both reference and measurement nozzles emitting an air flow onto reference and measurement surfaces to determine surface distances. An air gauge sensor is not vulnerable to concentrations of electric charges nor electrical, optical and other physical properties of the wafer's surface. Current semiconductor manufacturing techniques, however, require that proximity is gauged with high precision of the order of nanometers. Earlier versions of air gauge sensors, unfortunately, often do not meet today's lithography requirements for precision. Today's requirements for nanometer repeatability and registration accuracy are more stringent than what is currently available in the industry at large. Additionally, earlier devices do not meet today's needs for dimensional stability throughout specific temperature ranges.

What are needed are systems and methods for providing precise, nanometer-scale measurements by a gas gauge proximity sensor that also exhibits dimensional stability.

SUMMARY

Traditional air gauges operate with a flow rate according to the laminar flow regime. A gas gauge according to an embodiment of the present invention operates with a flow rate that corresponds to flows in the transitional region between laminar and turbulent flow. The transitional region includes flows having a Reynold's number between approximately 2100 and 5100.

In the transitional regime, the pressure drop across the surface of the nozzle face increases as the friction factor of that surface increases with increasing Reynold's number. Surface friction factor values are based on two surfaces, the nozzle face and the measurement surface. While the silicon wafer measurement surface cannot be interfered with, the nozzle face surface may be roughened to effectively increase the friction factor across the nozzle surface. The surface may be roughened, for example and without limitation, by shot-blasting the nozzle face to various "sand roughnesses;" flame-spraying a rough oxide coating on the nozzle face; machining circular, concentric rings into or protruding out of the nozzle face; machining numerous, small hemispherical depressions either into or out of the nozzle face while staggering their arrangement; and/or introducing dozens of staggered pins into the nozzle face. The nozzle face surface area and its roughness is important in dealing with the pressure drop of an air gauge within the transitional flow regime.

Noise generated by the increased flow rate may be attenuated by using one or more Helmholtz attenuators.

Further embodiments, features, and advantages of the invention, as well as the structure and operation of these various embodiments relative to the invention are described in detail below with reference to accompanying drawings.

BRIEF DESCRIPTION OF THE FIGURES

The present invention is described with reference to the accompanying drawings. In the drawings, like reference numbers indicate identical or functionally similar elements.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Figure 1:
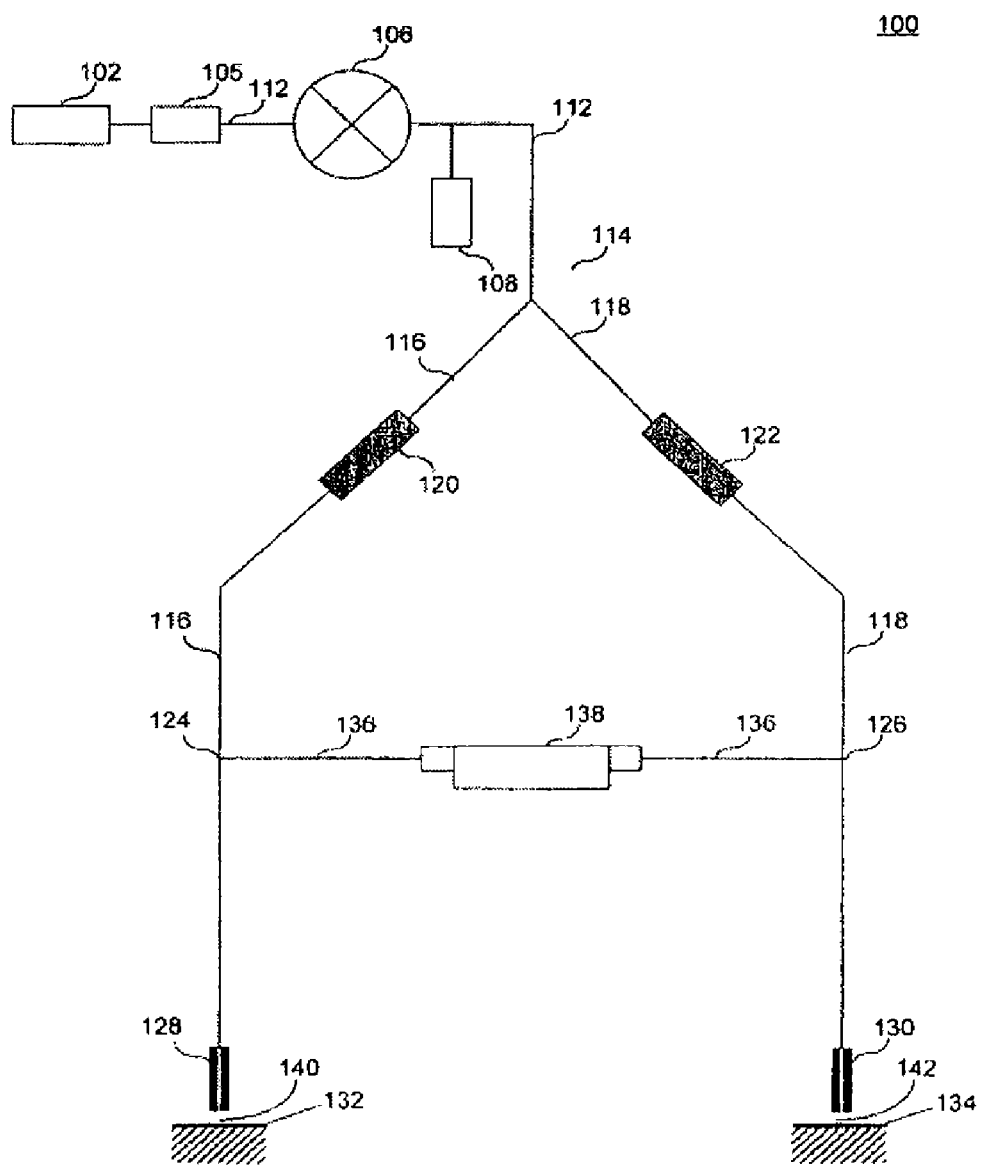
FIG. 1 is a functional diagram of a gas gauge proximity sensor.

FIG. 1 provides a diagram of gas gauge proximity sensor 100. Gas gauge proximity sensor 100 is one type of proximity sensor that can be improved through use of one or more embodiments of the present invention, and is not intended to limit the scope of the invention. Gas gauge proximity sensor 100 includes gas pressure regulator 105, mass flow controller 106, central channel 112, measurement channel 116, reference channel 118, snubber 120, snubber 122, measurement probe 128, reference probe 130, bridge channel 136 and mass flow sensor 138. Gas supply 102 injects gas at a desired pressure into gas gauge proximity sensor 100.

Central channel 112 connects gas supply 102 to gas pressure regulator 105 and mass flow controller 106 and then terminates at junction 114. Gas pressure regulator 105 and mass flow controller 106 maintains a constant flow rate within gas gauge proximity sensor 100.

Gas is forced out from mass flow controller 106 into channel 112 with an accumulator 108 affixed to channel 112. In some situations, a snubber can be placed between mass flow controller 106 and junction 114. Sensor 100 has two snubbers 120 and 122, placed at each leg of the flow split at junction 114. A snubber reduces gas turbulence and consequent noise introduced by the gas supply 102, and also acts as a resistive element. In other embodiments, other types of resistive elements such as orifices can be used, although orifices will not reduce turbulence.

Upon exiting mass flow controller 106, gas travels through central channel 112 to junction 114. Central channel 112 terminates at junction 114 and divides into measurement channel 116 and reference channel 118. Mass flow controller 106 injects gas at a sufficiently low rate to provide laminar and incompressible fluid flow throughout the system which minimizes the production of undesired pneumatic noise. Likewise, the system geometry can be appropriately sized to maintain the laminar flow characteristics established by mass flow controller 106.

Bridge channel 136 is coupled between measurement channel 116 and reference channel 118. Bridge channel 136 connects to measurement channel 116 at junction 124. Bridge channel 136 connects to reference channel 118 at junction 126. In one example, the distance between junction 114 and junction 124 and the distance between junction 114 and junction 126 are equal, which helps flow symmetry and gas gauge performance.

All channels within gas gauge proximity sensor 100 permit gas to flow through them. Channels 112, 116, 118, and 136 can be made up of conduits (tubes, pipes, etc.) or any other type of structure that can contain and guide gas flow through sensor 100. It is desirable that the channels do not have sharp bends, irregularities or unnecessary obstructions that may introduce pneumatic noise, for example, by producing local turbulence or flow instability. The overall lengths of measurement channel 116 and reference channel 118 can be equal or in other examples can be unequal. However, the lack of symmetry may hinder the performance of sensor 100 and require additional flow correction factors.

Reference channel 118 terminates into reference nozzle 130. Likewise, measurement channel 116 terminates into measurement nozzle 128. Reference nozzle 130 is positioned above reference surface 134. Measurement nozzle 128 is positioned above measurement surface 132. In the context of lithography, measurement surface 132 is often a substrate, semiconductor wafer, stage supporting a wafer, flat panel display, glass substrate, a print head, a micro- or nano-fluidic device or the like. Reference surface 134 can be a flat metal plate, but is not limited to this example. Gas injected by gas supply 102 is emitted from each of the nozzles 128, 130 and impinges upon measurement surface 132 and reference surface 134. As stated above, the distance between a nozzle and a corresponding measurement or reference surface is referred to as a standoff.

In one embodiment, reference nozzle 130 is positioned above a fixed reference surface 134 with a known reference standoff 142. Measurement nozzle 128 is positioned above measurement surface 132 with an unknown measurement standoff 140. The known reference standoff 142 is set to a desired constant value representing an optimum standoff. With such an arrangement, the backpressure upstream of the measurement nozzle 128 is a function of the unknown measurement standoff 140; and the backpressure upstream of the reference nozzle 130 is a function of the known reference standoff 142. If standoffs 140 and 142 are equal, the configuration is symmetrical and the bridge is balanced. Consequently, there is no gas flow through bridging channel 136. On the other hand, when the measurement standoff 140 and reference standoff 142 are different, the resulting pressure difference between the measurement channel 116 and the reference channel 118 induces a flow of gas through mass flow sensor 138.

Mass flow sensor 138 is located along bridge channel 136, for example, at a central location. Mass flow sensor 136 senses gas flows induced by pressure differences between measurement channel 116 and reference channel 118. These pressure differences occur as a result of changes in the vertical positioning of measurement surface 132. For a symmetric bridge, when measurement standoff 140 and reference standoff 142 are equal, the standoff is the same for both of the nozzles 128, 130 compared to surfaces 132, 134. Mass flow sensor 138 will detect no mass flow, since there will be no pressure difference between the measurement and reference channels. Differences between measurement standoff 140 and reference standoff 142 will lead to different pressures in measurement channel 116 and reference channel 118. Proper offsets can be introduced for an asymmetric arrangement.

Mass flow sensor 138 senses gas flow induced by a pressure difference or imbalance. A pressure difference causes a gas flow, the rate of which is a unique function of the measurement standoff 140. In other words, assuming a constant flow rate into gas gauge 100, the difference between gas pressures in the measurement channel 116 and the reference channel 118 is a function of the difference between the magnitudes of standoffs 140 and 142. If reference standoff 142 is set to a known standoff, the difference between gas pressures in the measurement channel 116 and the reference channel 118 is a function of the size of measurement standoff 140 (that is, the unknown standoff between measurement surface 132 and measurement nozzle 128).

Mass flow sensor 138 detects gas flow in either direction through bridge channel 136. Because of the bridge configuration, gas flow occurs through bridge channel 136 only when pressure differences between channels 116, 118 occur. When a pressure imbalance exists, mass flow sensor 138 detects a resulting gas flow, and can initiate an appropriate control function. Mass flow sensor 138 can provide an indication of a sensed flow through a visual display, audio indication, computer controlled system or other signaling means. Alternatively, in place of a mass flow sensor, a differential pressure sensor may be used. The differential pressure sensor measures the difference in pressure between the two channels, which is a function of the difference between the measurement and reference standoffs.

Proximity sensor 100 is provided as one example of a device with a nozzle that can benefit from one or more embodiments of the present invention. These exemplary embodiments of the present invention are not intended to be limited to use with only proximity sensor 100. Rather the exemplary embodiments of the present invention can be used to improve other types of proximity sensors.

Figure 2:
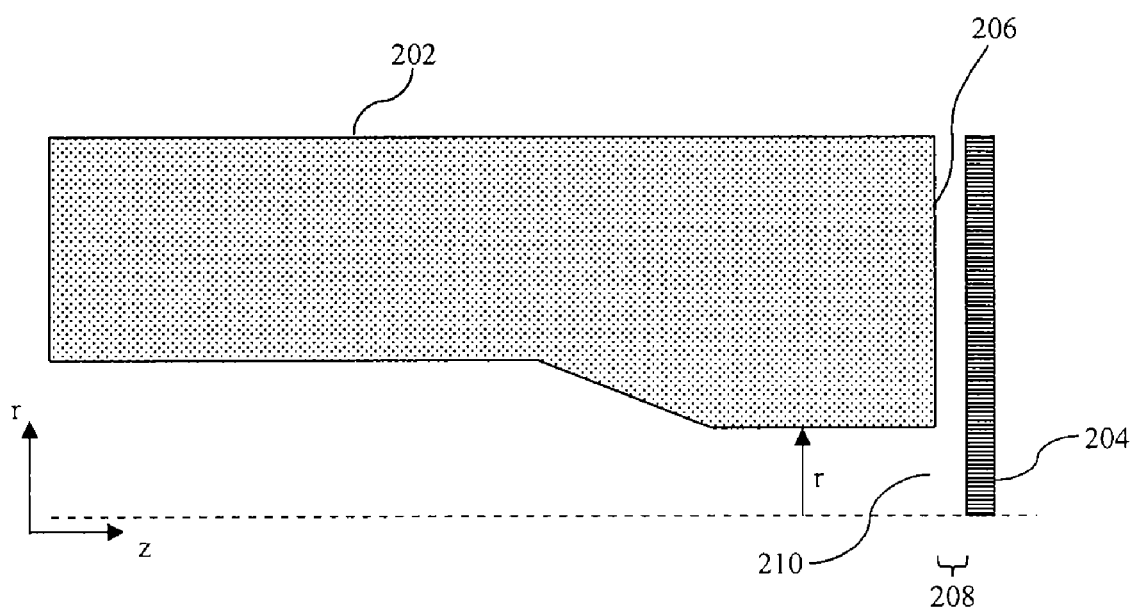
FIG. 2 is a cross-sectional diagram of a nozzle in a gas proximity sensor.

FIG. 2 is an illustration providing further detail of an exemplary measurement nozzle 202. Nozzle 202 may be similar to, for example, measurement nozzle 128 of FIG. 1. In FIG. 2, nozzle 202 is proximate to an object or measurement surface 204. Nozzle 202 has a nozzle face 206 that is substantially parallel to surface 204. Nozzle face 206 is separated from surface 204 by a distance 208. Gas typically flows out of the nozzle in the z direction through an orifice 210, and then radially outward between nozzle face 206 and surface 204. The pressure drop of the gas across nozzle face 206 is indicative of the height of distance 208.

Effect of Flow Rate on Performance

As indicated above, the distance between a measurement nozzle and a measurement surface (e.g., distance 208 between nozzle face 206 and surface 204 of FIG. 2) may be determined by outputting a gas stream at a steady rate and measuring the pressure drop (also referred to as the backpressure) of the gas stream across nozzle face 206. To improve the performance, the correlation between the local pressure drop and the gap height is increased. For a given gas flow rate and gap-height, the pressure drop can be related to a friction factor of the nozzle face times the radial length of the nozzle face.

Previous gauges have operated at a gas flow rate in the "laminar flow" region. Such a flow rate has been sufficient for the level of measurement needed by these systems. However, these laminar flow gas gauges are not sensitive enough to accurately measure distances in the nanometer range. To increase the performance of the gauge such that it has nanometer-level measurement sensitivity, the gain of the gauge must be increased. To increase the gain, the nozzle pressure drop per unit change in nozzle height from the measurement surface must be improved.

Increasing the friction factor across the nozzle face increases the pressure drop across the measuring surface. However, the physics of this pressure drop scenario only works for nozzle surfaces whose local Reynold's number is in a "transitional flow" region rather than the laminar flow region. The Reynold's number (Re) is calculated as follows:

$$\left[ Re = \frac{\rho V D}{\mu} \right],\quad\text{(Eq. 1)}$$

where $\rho$ is the density of the gas, V is the radial velocity of the gas over the nozzle face, D is the local characteristic dimension of the flow (which in a gas gauge nozzle is the diameter of the nozzle defined by the complex geometric relationship of Eq. 2), and $\mu$ is the viscosity of the gas.

Figure 3:
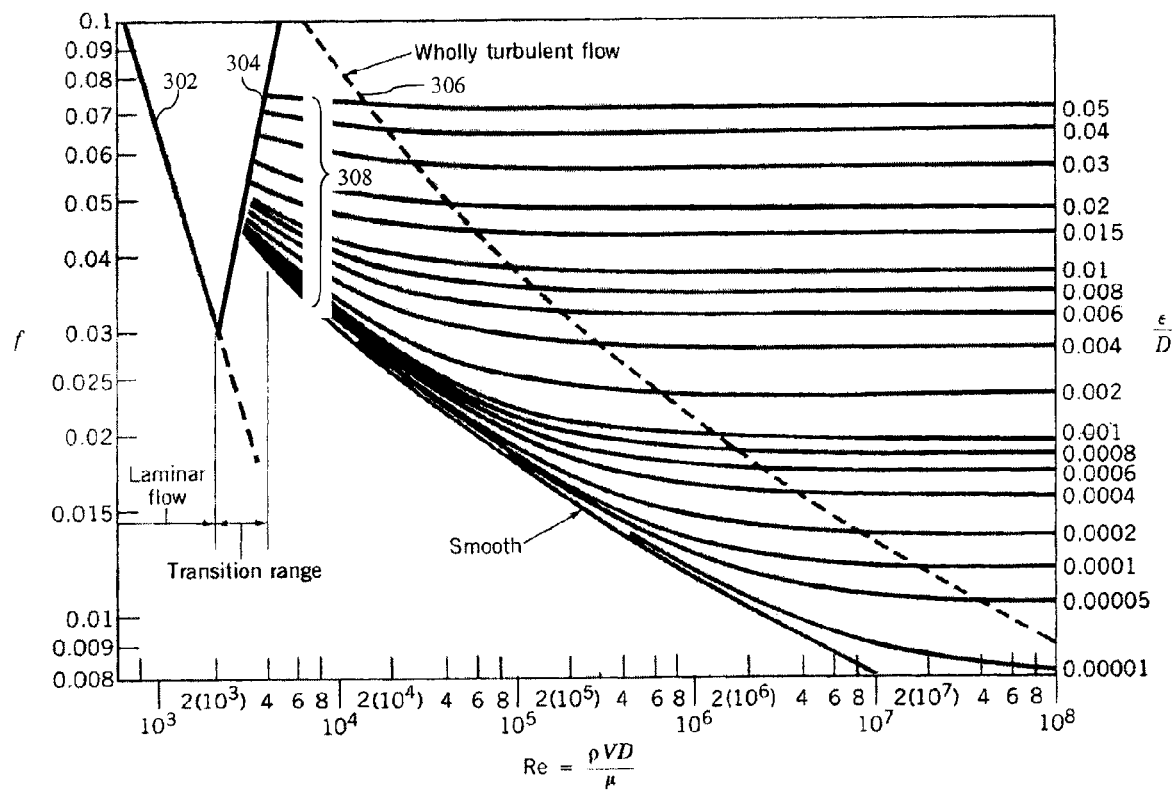
FIG. 3 is a graph illustrating Reynold's number versus friction factor that identifies the four flow regimes, namely laminar, critical, transitional, and turbulent, and the effect of surface "relative roughness" upon each regime.

FIG. 3 is a logarithmic graph illustrating Reynold's number on the horizontal axis and friction factor on the vertical axis. FIG. 3 is commonly referred to as a "Moody plot." Further description of the Moody plot may be found in, for example, L. F. Moody, "Friction Factors for Pipe Flow," ASME Trans., vol. 66, pp. 671-684, 1944, which is incorporated by reference herein in its entirety.

Previous gas gauges operated at flow rates having a Reynold's number of approximately 200-300. As illustrated in FIG. 3, such a flow rate is in the laminar flow region. The laminar flow region is defined by curve 302. At a Reynold's number of approximately 2100, gas flow rates begin to change from the laminar flow region into a transitional flow region. The transitional flow region is defined by curve 304. As the Reynold's number increases, the flow rates begin to switch to a fully turbulent region, defined by curve 306. Increasing the Reynold's number is typically avoided when operating in the laminar flow regime, as it decreases the friction factor of the nozzle, and thereby decreases the gain available from the gauge. However, when the Reynold's number is increased past the laminar flow regime to the transitional flow regime, the friction factor begins to increase as the Reynold's number increases.

The flowfield of a nozzle operating in the transitional region is opposite in frictional performance to that of traditional nozzles operating in a laminar flow region, where the friction factor slowly decreases with increasing Reynold's number. The sensitivity of this frictional decrease is measured by the differences in slopes between curves 302 and 304 of FIG. 3. Curve 302, which follows the Hagen-Puiseuille law of frictional flow, has a slope of about $m_1 = -1.0$, while curve 304 has a slope of about $m_2 = +1.39$. While the sign of the slope of curve 304 marks a reversal in frictional affect, what is significant is that curve 304 exhibits about a 39% steeper slope. The change from the laminar flow region to the transitional flow region physically implies a channel flow undergoing a velocity profile change. The velocity profile changes from a parabolic velocity distribution to a modified, truncated hyperbolic velocity distribution. Friction within the transitional flow region influences nozzle flow pressure drops since the friction factor changes most dramatically within this zone, as seen by the positive steepness of the slope of curve 304. An increase in Reynold's number thereby results in a sensitivity increase in relating pressure drop to nozzle distances from the plate, yielding a more responsive relative gain with gap height measurements.

As can be seen in Eq. 1, the Reynold's number is dependent on the density of the gas used, the radial velocity of the gas over the nozzle face, the complex characteristic diameter of the nozzle, and the viscosity of the gas used. If the same gas (such as, for example, air) is used in the transitional flow nozzle as was used in the laminar flow nozzle, the density and viscosity of the gas cannot be changed. The only way to increase the Reynold's number is to either increase the velocity of the gas through the nozzle or to increase the characteristic diameter of the nozzle.

Given the difficulties inherent in increasing the diameter of the nozzle, the Reynold's number is increased in an embodiment of the present invention by increasing the velocity (also referred to as the flow rate) of the gas through the nozzle. A traditional laminar flow gauge typically exhibits a volumetric gas flow rate of approximately 1000 sccm (standard cubic centimeters per minute). Increasing the Reynold's number to a transitional flow regime having a Reynold's number of approximately 2100 while varying only the flow rate results in a flow rate of approximately 6800 sccm.

Figure 4:
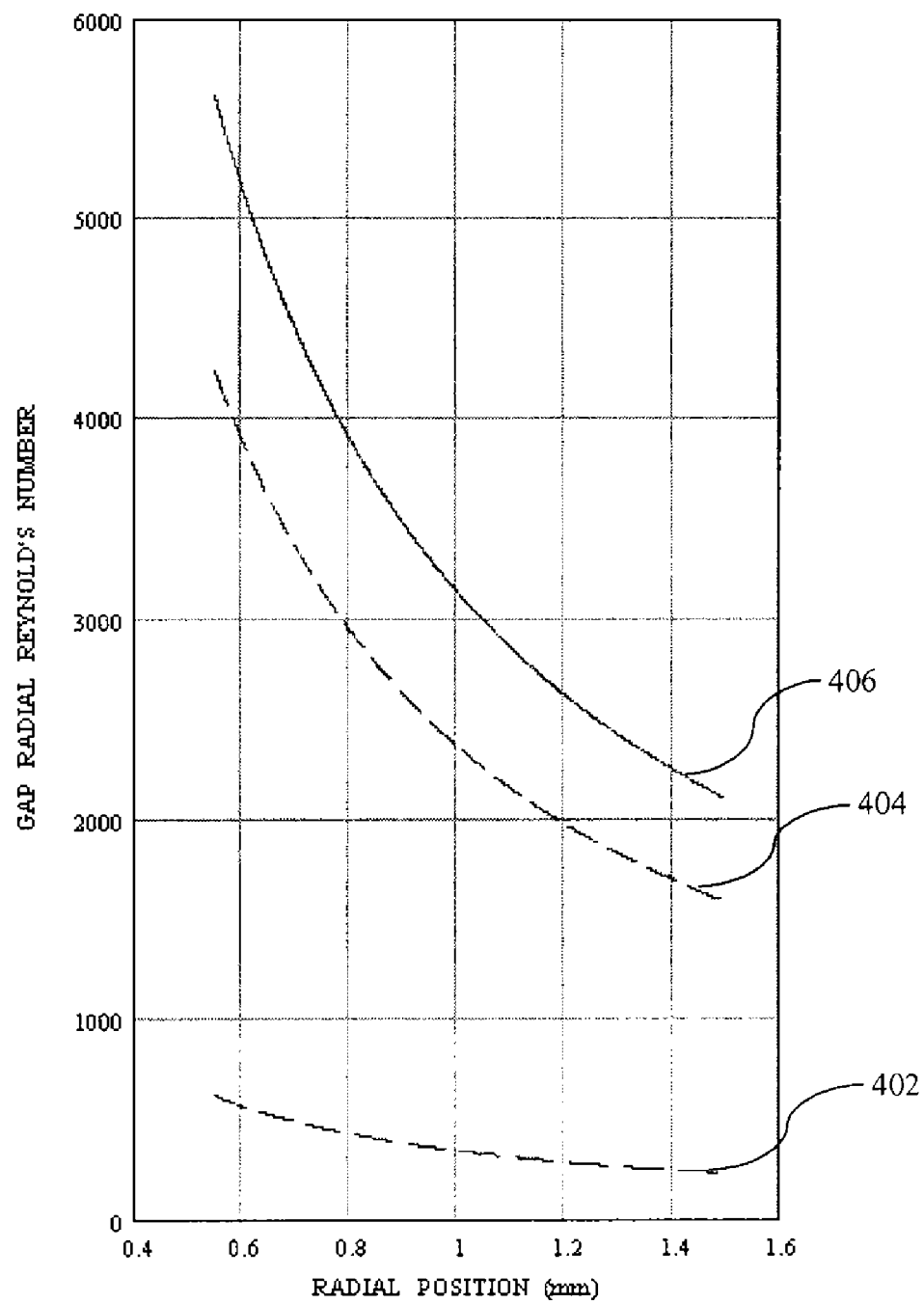
FIG. 4 illustrates the radial variation of Reynold's number across a nozzle face for various gas flow rates.

FIG. 4 illustrates an exemplary change in Reynold's number at various positions extending radially outward from orifice 210 across nozzle face 206 in FIG. 2 for different gas flow rates. The radial position of the measurement in mm is illustrated on the horizontal axis, while the Reynold's number for gas flow in the gap between the nozzle face and the measurement surface is illustrated on the vertical axis. The change in Reynold's number as the radial position increases is indicative of two events: 1) the change in pressure drop of the gas across the nozzle surface due to the local friction factor changing with local Reynold's number, and 2) the constant change in the local characteristic dimension (D) of the flow as it moves radially outward. D changes as a function of the change in the local hydraulic diameter ($D_h$) of the nozzle face as the flow exits radially, and is defined as follows:

$$\left[ D = D_h = \frac{2\pi D_x H}{\pi D_x + H} \right], \quad (Eq.\ 2)$$

where $D_x$ is the local diameter of the flow moving out radially, and H is the measured gap height of the nozzle.

Curve 402 illustrates the pressure drop for a traditional laminar flow nozzle (e.g., flow rate of approximately 1000 sccm). The Reynold's number for curve 402 is between approximately 230 and approximately 625. Curve 404 illustrates the pressure drop for a transitional flow nozzle at a lower flow rate (e.g., flow rate of approximately 6800 sccm). The average Reynold's number for curve 404 is approximately 2900. Curve 406 illustrates the pressure drop for a transitional flow nozzle at a higher flow rate (e.g., flow rate of approximately 9000 sccm). The average Reynold's number for curve 406 is approximately 3900. As illustrated, the pressure drop across the nozzle face is greatest for curve 406. Because the pressure drop is greater, the transitional flow nozzle operating at a higher flow rate is more sensitive to small changes in pressure than a transitional flow nozzle operating at a lower flow rate, which is still more sensitive to pressure changes than a laminar flow nozzle.

Figure 5:
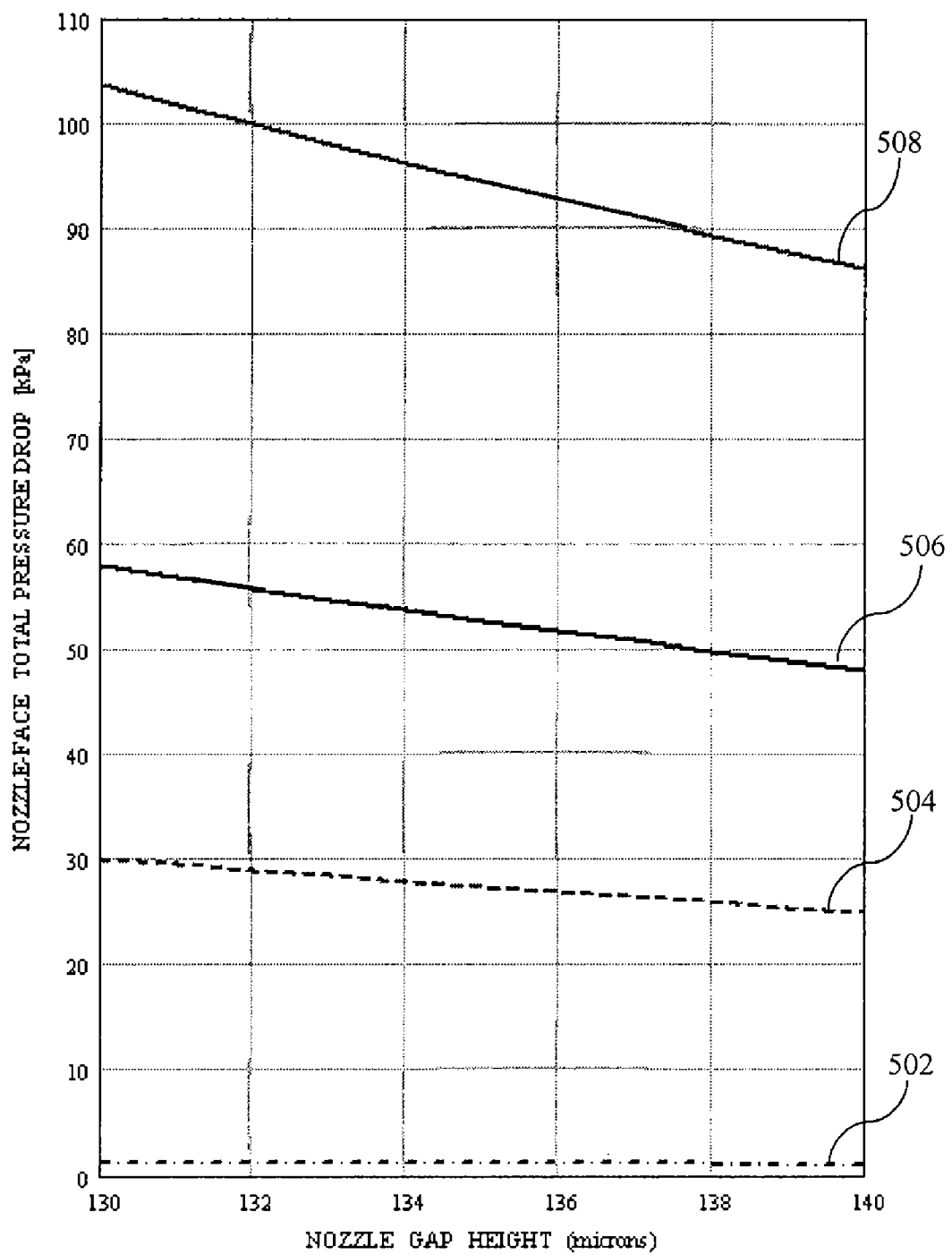
FIG. 5 illustrates the theoretical amount of gain (relative pressure drop per gap-height change) available for a gas gauge nozzle according to an embodiment of the present invention.

FIG. 5 illustrates a theoretical amount of gain available within a transitional versus laminar friction factor regime according to nozzle operation. Gain, as used herein, is determined by finding the local slope of a given curve of pressure drop versus gap height calculated at 135 microns. The nozzle cap height in microns is illustrated on the horizontal axis, while the total pressure drop in kPA across the nozzle face is illustrated on the vertical axis. Curve 502 illustrates a theoretical gain of a laminar flow nozzle operating at a flow rate of approximately 1000 sccm. The gain of curve 502 is approximately 0.024 kPa/micron. Curve 504 illustrates a theoretical gain of a transitional flow nozzle having a relative roughness of approximately $10^{-6}$ (e.g., a smooth surface) operating at a lower flow rate of approximately 4900 sccm. The gain of curve 504 is approximately 0.512 kPa/micron. Curve 506 illustrates a theoretical gain of a transitional flow nozzle having a relative roughness of approximately $10^{-6}$ operating at a higher flow rate of approximately 6800 sccm. The gain of curve 506 is approximately 0.983 kPa/micron. Curve 508 illustrates a theoretical gain of a transitional flow nozzle having a relative roughness of approximately 0.05 operating at a higher flow rate of approximately 9000 sccm. The gain of curve 508 is approximately 1.759 kPa/micron.

As illustrated in FIG. 5, a theoretical improvement in gain from about 0.024 to about 0.512 kPa/micron (a gain of about 21×) can be achieved by transitioning from a laminar flow rate (e.g., curve 502) to a low transitional flow rate system (e.g., curve 504). Further, a theoretical improvement in nozzle gain from about 0.512 to about 0.983 kPa/micron (an overall gain of about 41×), and even to about 1.759 kPa/micron (for an overall gain of about 73×) can be achieved by transitioning from a laminar flow rate (e.g., curve 502) to a high transitional flow rate (e.g., curve 506 and curve 508, respectively).

While FIG. 5 illustrates the gain in terms of absolute gains, the relative gain may also be determined by theoretically treating the flow as if it were always laminar. To determine this relative gain, the isolated instance of increasing the nozzle flow rate and corresponding pressure drop is evaluated strictly using the laminar flow correlation, without considering the actual physics of the existence of a transitional region. Such results indicate the strict relative gains from flowing at a rate of approximately 6800 sccm (as compared to approximately 1000 sccm) and using the original laminar friction factor of curve 302 in FIG. 3, extrapolated to a Reynold's number of about 2900. This produces a relative gain of about 0.82 kPa/micron (a gain of about 39×). When this relative gain result is compared to the absolute gain results of about 0.983 illustrated in FIG. 5, it is evident that an additional increase in gain of about 20% may be obtained by moving into the transitional flow regime of curve 304 of FIG. 3. Such flowfield transitions are naturally obeyed in flows when triggered by a nozzle face with a relative roughness greater than approximately $10^{-6}$, which is the relative roughness of a smooth surface.

In terms of absolute gain, increasing flows by a factor of about seven (from 1000 to 6800 sccm) results in a significant nozzle gain improvement by a factor of about 41 and greater up to a Reynold's number value of about 5000. Increased flow-rates enable operation in the transition region, where nozzle pressure drops increase from approximately 5 kPa to over approximately 225 kPa. In addition to increasing pressure drops, such losses also reduce the need for high instrumentation sensitivity, as the higher gain allows less sensitive pressure transducers to be used for measuring resultant gap heights.

Nozzle Face Roughening

Previous gas gauges operated at a laminar flow rate having a Reynold's number of approximately 200-300. At such Reynold's numbers and up to a Reynold's number of about 2100, surface relative-roughness of the nozzle face (RR) has virtually no effect on the pressure drop. Relative-roughness is defined as the ratio of the height of repeatable surface irregularities to the hydraulic diameter of the nozzle geometry and gap height combination as shown in Eq. 2. At Reynold's numbers in the transitional flow regime (2100<Re<5100), however, the friction factor of the nozzle, which is correlated to the gain of the gauge, is a variable depending upon the roughness of the nozzle-face surface. As indicated by curves 308 in FIG. 3, increases in the roughness of the nozzle face help increase the maximum attainable friction factor up to a value of about 0.1. In the transitional flow region, experiments show that the friction factor attainable is dependent on the roughness of the nozzle face over which the gas flows. For smooth nozzle faces, a maximum friction factor of approximately 0.045 is attainable at a Reynold's number of approximately 3000. For nozzles having a very rough surface (RR>0.05), a maximum friction factor ($f_{TRANSITIONAL}$) of approximately 0.08 to approximately 0.10 is attainable at Reynold's numbers of approximately 4200 to approximately 5100. Consequently, the pressure drop ($\Delta P$) for a given gap height (H) over the nozzle-face surface $$\left( \left( \frac{L}{D} \right)_{BAR} \right)$$

also increases proportionately with increasing Reynold's number as follows:

$$\left[ \Delta P = f_{TRANSITION} \left( \frac{L}{D} \right)_{BAR} \left( \frac{\rho V^2}{2} \right) = \right. \quad (Eq.\ 3)$$

$$(7 \times 10^7 * \text{Re}^{1.39}) \left( \frac{Do + Di}{8H} + \frac{1}{4\pi} \right) \left( \frac{\rho V^2}{2} \right) ],$$

where Do is the outer diameter of the nozzle-face surface and Di is the inner diameter of the nozzle-face surface.

FIG. 5, as described above, illustrates the theoretical gain of the nozzle available in a transitional flow regime. Whereas curve 506 illustrates the gain of a transitional flow nozzle at a higher flow rate, the gain is based on a nozzle having a relatively smooth surface. Curve 508 illustrates the theoretical gain of a transitional flow nozzle whose surface has been roughened, when the nozzle is operated at a higher flow rate.

Compared to traditional laminar flow nozzles, then, increased performance of a gas gauge can be obtained by roughening the surface of the nozzle face and operating the gauge in the transitional flow region.

The nozzle face may be roughened by adding specific surface irregularities to it. For measurement of heights in the nanometer range, the surface irregularities may be, for example, nano- or micro-irregularities. There are various ways to roughen the nozzle surface.

In one example, the nozzle-face may be shot-blasted to various equivalent "sand roughnesses" to a level defined by a Moody plot for flow resistances, such as FIG. 3. In another example, a rough oxide coating may be flame-sprayed on the nozzle face.

Figure 6:
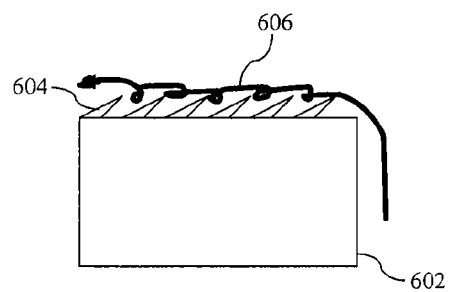
FIG. 6 is a cross-section of a nozzle having saw-tooth cuts according to an embodiment of the present invention.
Figure 7A:
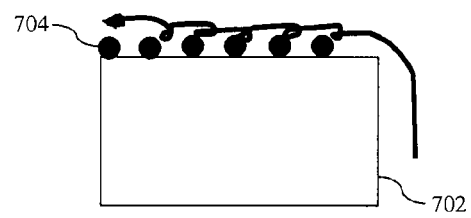
FIG. 7A is a cross-section of a nozzle having hemispherical protrusions according to an embodiment of the present invention.
Figure 7B:
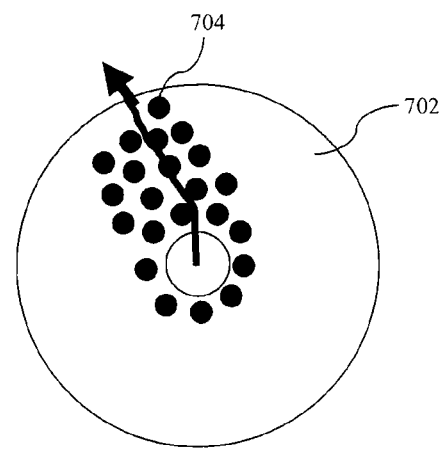
FIG. 7B is a surface view of a nozzle having hemispherical depressions according to an embodiment of the present invention.

In still another example, the nozzle face may be machined into various configurations. In one embodiment, circular, concentric rings are machined either into or protruding out of the nozzle face. FIG. 6 is a cross-section of exemplary nozzle face 602. As illustrated in FIG. 6, rings 604 may be, for example, saw-tooth cuts. The flow of gas 606 across nozzle face 602 is inhibited due to the increased friction factor and flow rate in the transitional flow region. FIG. 7A illustrates another embodiment, in which numerous small, hemispherical depressions 704 are machined either into or out of nozzle face 702. To prevent flow channels from developing across nozzle face 702, the arrangement of depressions 704 across nozzle face 702 may be staggered.

In a further example, dozens of staggered pins may be introduced into the nozzle face by, for example, using silicon etching techniques to create an array of pins on a silicon chip that is then epoxied to the face of the nozzle. The pins may have a diameter of, for example, approximately 10 microns and a height of, for example, approximately 10 microns.

Increasing the roughness of the nozzle surface also increases the possibility that the nozzle will receive false feedback or pushback from air interacting with the roughened surface. Such false feedback may be minimized by, for example, starting with a high roughness inside the nozzle face and transitioning the level of the roughness as the radial distance from the nozzle is increased. In another example, the reference nozzle may also be roughened so as to cancel out the effect of false feedback from the roughened measurement nozzle surface.

To reduce the effect of temperature on the nozzle, the nozzle may be made from a material that is resistant to thermal expansion. An example material is a hybrid iron-nickel metal such as Invar.

Figure 9:
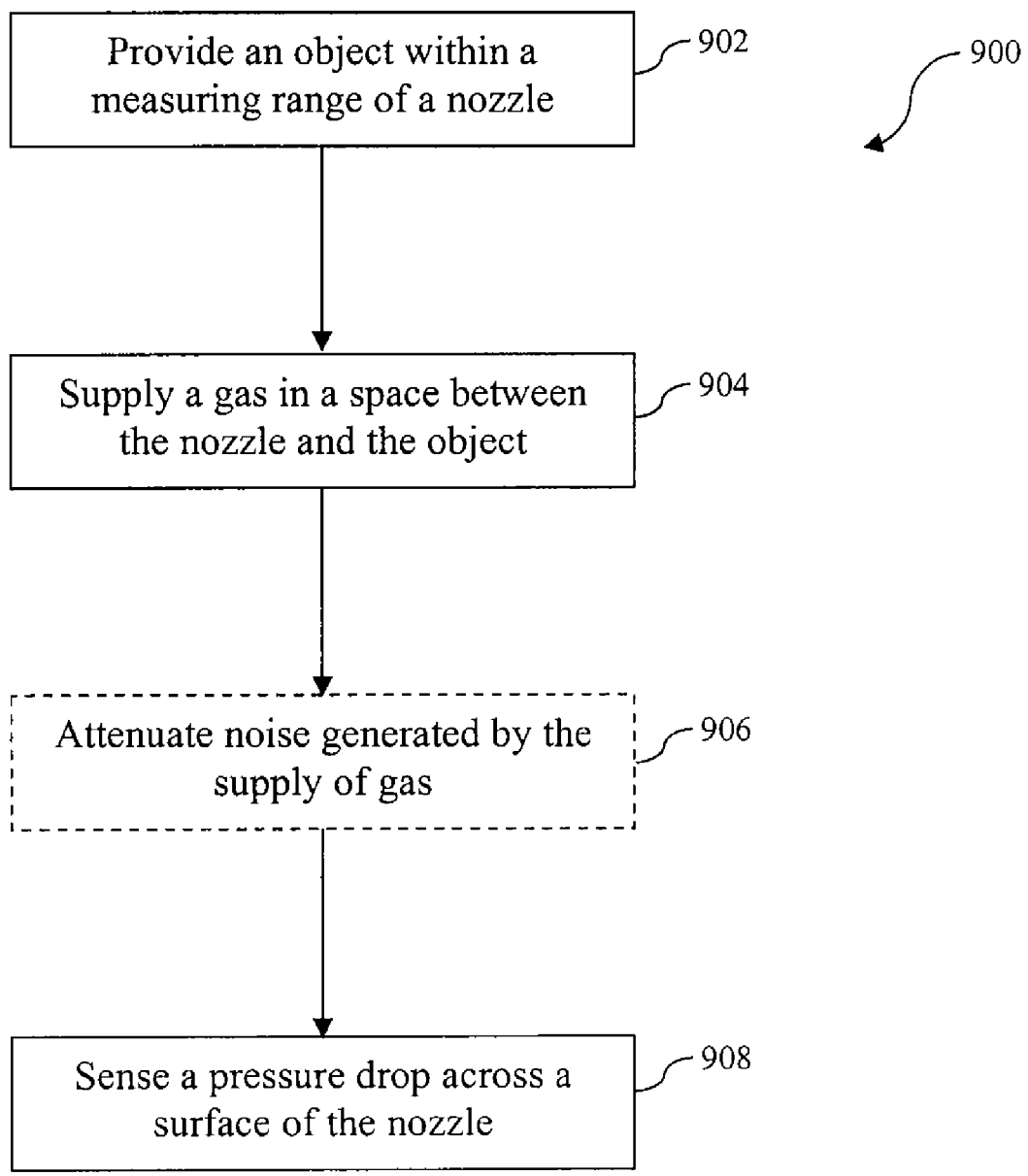
FIG. 9 is a flowchart of a method of sensing distance to an object according to an embodiment of the present invention.

FIG. 9 is a flowchart of a method 900 for sensing a distance to an object from a nozzle, according to an embodiment of the present invention. Method 900 may be used, for example, with a gas gauge. In step 902, the object is provided within a measuring range of the nozzle. The object may be, for example and without limitation, a substrate or semiconductor wafer surface. The surface of the nozzle facing the object may be roughened as described above.

In step 904, a gas is supplied in a space between the nozzle and the object. The gas may be, for example and without limitation, air. The gas is supplied in the space with a flow rate that corresponds to a Reynold's number flow in the transitional region between laminar flow and turbulent flow.

In optional step 906, noise generated by the supply of gas is attenuated. The noise may be attenuated, for example, as described below.

In step 908, a pressure drop across the nozzle face is sensed. The pressure drop is indicative of the distance to the substrate surface.

Noise Attenuation

The nozzle gap Reynold's number used in existing systems is approximately 200-300, with a nominal nozzle gap height of about 135 microns. Such a system requires an airflow of approximately 1000 sccm. Operation above a Reynold's number of approximately 2100 requires a flow rate of at least approximately 3400 sccm. Although the gain is theoretically increased when the nozzle is operated at such a high flow rate, the noise generated by such a high flow rate may disrupt the sensitivity of the nozzle unless the noise is abated.

This noise may be attenuated by the muffling effect of the nozzle face surface irregularities. Nozzle pressure drop increases with increasing nozzle face roughness for a given transitional flowfield, since the local boundary layer buildup forms local recirculation zones which act to attenuate acoustic noise emanating from the nozzle throat. Acoustic noise emanating from the nozzle thus abates with increased flow rate. The positive slope in the friction factor correlation of curve 304 in FIG. 3 shows that the pressure energy from the nozzle's radial flow is being positively dampened at an exponential rate of $m_2 = 1.39$, plus a factor correlating to increased roughness. This is in direct contrast to the negative slope relationship existing for all laminar flow friction factors where surface roughness is immaterial to pressure loss and consequent noise attenuation.

Considering that a negative friction factor slope (as in laminar flow) causes the pressure energy to decrease with increasing Reynold's number, a nozzle operating at a laminar flow rate exhibits poor noise abatement compared to a nozzle operating at a transitional flow rate. Therefore, while previous, laminar flow nozzles exhibited poor noise abatement when the flow rate was increased, transitional flow nozzles do the opposite and aggressively abate noise through the introduction of roughened flow surfaces.

Snubbers have been successfully used to attenuate noise. These systems force the flow through a labyrinth of irregular channels that cause a reduction in flow turbulence and its corresponding noise. Snubbers have been used in air gauges as, for example, snubbers 120 and 121 in FIG. 1. Snubbers are very useful as noise attenuators when gauge flows exceed 1000 sccm. Their use at strategic flow turns and splits may increase during nozzle operation at increased flow to achieve a transitional flow regime with enhanced performance gain.

Figure 8:
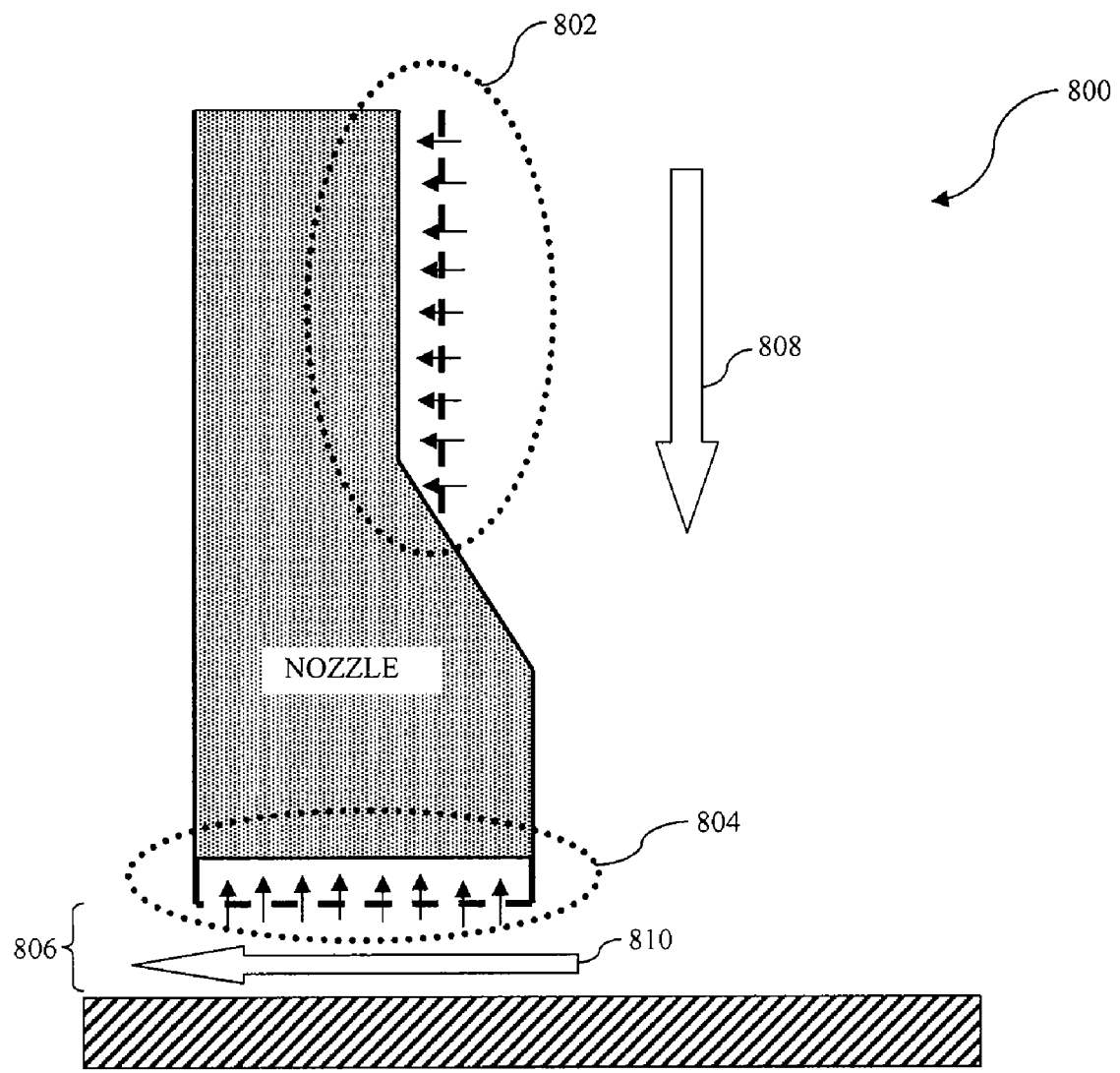
FIG. 8 illustrates a nozzle having a Helmholtz attenuator according to an embodiment of the present invention.

Additionally or alternatively, the Helmholtz effect may also be used to act as a muffler in attenuating the noise from acoustic pressure pulses. Strategically-placed Helmholtz sound absorbing cavities (referred to herein as Helmholtz attenuators) may be used to attenuate unwanted nozzle noise. FIG. 8 illustrates a cross-section of a gas gauge nozzle 800 having Helmholtz attenuators 802 and 804.

As illustrated in FIG. 8, Helmholtz attenuators can be discrete, local cavities arranged parallel with the airflow and specifically designed to absorb unwanted acoustic frequencies. A Helmholtz attenuator, such as attenuator 802 or 804, is essentially a cavity covered by a false working wall containing multiple perforations that allow pressure pulsations (that is, noise) to expand normal to the flow direction. The pressure pulsations are then trapped in the cavity, which absorbs the pulsations.

FIG. 8 illustrates two regions of nozzle 800 where the introduction of a Helmholtz attenuator can dramatically attenuate pressure pulsation noises. Attenuator 802 is located inside the barrel of the nozzle, where upstream-generated noise is absorbed or muffled before the noise escapes the nozzle throat region. Attenuator 804 is located within the face of the nozzle to reduce noise from the gas passing through gap 806 and escaping nozzle 800. So that attenuators 802 and 804 do not interfere with the pressure measurement of the gas gauge, attenuators 802 and 804 are located at places in the nozzle that do not affect the friction factor. Further, the surface of attenuator 804 (that is, the area between the holes in attenuator 804) may be roughened in accordance with the rest of the nozzle face. Arrows 808 and 810 illustrate the path of the gas exiting the nozzle in an outward direction.

As is well known to one of skill in the art, a Helmholtz attenuator can be tuned to a particular acoustic frequency by selecting specific geometric hole sizing, geometric hole spacing and cavity dimensions of the Helmholtz attenuator. The properties of a Helmholtz resonator (e.g., hole sizing, hole spacing, cavity width, etc.) are determined by the frequency of the noise to be abated.

Some noise is useful for logic correction within feedback loops, such as noise caused by temperature fluctuations or noise caused by the electronics of the system, and should not be removed from the system. Other noise, such as noise caused by increased airflow, needs to be removed. Once the frequency band of noise to be removed is determined, the diameter of holes in the plate of the Helmholtz attenuator, the spacing of the holes, and the cavity depth are designed so as to remove noise at that frequency band. If multiple frequency bands are to be abated, multiple Helmholtz attenuators may be used. Alternatively, a single Helmholtz resonator having multiple compartments may be used, where each compartment is optimized for a given frequency band.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention. Thus, the present invention should not be limited by any of the above described exemplary embodiments, but should be defined only in accordance with the following claims and their equivalents.

Further, the purpose of the foregoing Abstract is to enable the U.S. Patent and Trademark Office and the public generally, and especially the scientists, engineers and practioners in the art who are not familiar with patent or legal terms or phraseology, to determine quickly from a cursory inspection the nature and essence of the technical disclosure of the application. The Abstract is not intended to be limiting as to the scope of the present invention in any way.

The invention claimed is:

1. An air gauge for sensing a distance to an object, comprising:
   a gas supply system configured to supply a gas; and
   a nozzle coupled to the gas supply system and arranged to supply the gas from the gas supply system to a space defined between the nozzle and the object;
   wherein the gas supply system is arranged to supply the gas with a flow rate that corresponds to a flow in a transitional region between laminar flow and turbulent flow within the space between the nozzle and the object.

2. The air gauge of claim 1, wherein the nozzle comprises an output face provided with an orifice for supplying the gas to the space between the nozzle and the object.

3. The air gauge of claim 1, further comprising a noise attenuator located in the nozzle.

4. The air gauge of claim 3, wherein the noise attenuator is a Helmholtz resonator located on an inner wall of the nozzle.

5. The air gauge of claim 3, wherein the noise attenuator is a Helmholtz resonator located on the output face of the nozzle.

6. The air gauge of claim 5, wherein the surface of the Helmholtz resonator has a surface irregularity that increases a friction factor of the surface.

7. The air gauge of claim 1 or 2, wherein the gas supply is arranged to supply the gas at a flow rate that corresponds to a local Reynold's number higher than at least one of approximately 2000 and 2100 between the output face and the object.

8. The air gauge of claim 1, 2, or 7, wherein the gas supply is arranged to supply the gas at a flow rate that corresponds to a local Reynold's number lower than at least one of approximately 4200 and 5100 between the output face and the object.

9. The air gauge of claim 1, 2, 7, or 8, wherein the gas supply system provides gas across the output face at a flow rate in a range of approximately 3400 standard cubic centimeters per minute to approximately 9000 standard cubic centimeters per minute.

10. The air gauge of claim 2, wherein the output face of the nozzle comprises:
    a surface of the nozzle; and
    a washer formed with a set of surface irregularities and coupled to the surface of the nozzle.

11. The air gauge of claim 2, wherein the output face comprises a surface irregularity configured to increase a friction factor of the output face in an outward direction from the orifice to an edge of the output face.

12. The air gauge of claim 11, wherein the surface irregularity on the output face of the nozzle includes concentric rings formed in the output face.

13. The air gauge of claim 11, wherein the surface irregularity on the output face of the nozzle includes concentric rings protruding out from the output face.

14. The air gauge of claim 11, wherein the surface irregularity on the output face of the nozzle includes at least one of a plurality of hemispherical depressions or a plurality of hemispherical protrusions on the output face.

15. A method for sensing a distance to an object from a nozzle, comprising:
    providing the object within a measuring range of the nozzle; and supplying a gas in a space between the nozzle and the object;

wherein the gas is supplied in the space with a flow rate that corresponds to a flow in a transitional region between laminar and turbulent flow.

16. The method of claim 15, wherein supplying a gas comprises supplying gas at a flow rate in a range of approximately 3400 standard cubic centimeters per minute to approximately 9000 standard cubic centimeters per minute.

17. The method of claim 15, wherein supplying a gas comprises supplying a gas flow sufficient to create a local Reynold's number between the nozzle face and the object that generates a transitional flow regime.

18. The method of claim 15, further comprising:
attenuating, in the nozzle, noise produced by an air gauge.

19. The method of claim 18, wherein attenuating noise comprises attenuating noise using a Helmholtz resonator located on an inner wall of the nozzle.

20. The method of claim 18, wherein attenuating noise comprises attenuating noise using a Helmholtz resonator located on an output face of the nozzle.

21. The method of claim 18 or 20, wherein attenuating noise further comprises attenuating noise using the combined use of at least one snubber placed at a strategic air gauge flow turn and a Helmholtz resonator located on the output face of the nozzle.

22. The method of claim 18 or 20, wherein attenuating noise further comprises attenuating noise using a Helmholtz resonator having a surface irregularity that increases a friction factor of a Helmholtz resonator surface.

23. The method of claim 15, wherein supplying a gas comprises supplying the gas across an output face of the nozzle provided with an orifice for supplying the gas in the space.

24. The method of claim 23, wherein supplying a gas further comprises supplying the gas across a surface irregularity on the output face of the nozzle, wherein the surface irregularity increases a friction factor which increases a pressure drop along the output face in an outward direction from the orifice to an edge of the output face.

25. The method of claim 15 or 23, wherein supplying a gas further comprises supplying the gas at a flow rate that corresponds to a local Reynold's number higher than at least one of approximately 2000 and 2100 between the output face and the object.

26. The method of claim 15, 23, or 25, wherein supplying a gas further comprises supplying the gas at a flow rate that corresponds to a local Reynold's number lower than at least one of approximately 4200 and 5100 between the output face and the object.

27. The method of claim 23 or 24, wherein supplying a gas comprises:
supplying the gas across a washer formed with a set of surface irregularities added to a surface of the nozzle.

28. The method of claim 23 or 24, wherein supplying a gas further comprises:
supplying the gas across the output face of the air gauge nozzle, wherein the output face has concentric rings formed in the output face.

29. The method of claim 23 or 24, wherein supplying a gas further comprises:
supplying the gas across the output face of the air gauge nozzle, wherein the output face has concentric rings protruding out from the output face.

30. The method of claim 23 or 24, wherein supplying a gas further comprises:
supplying the gas across the output face of the air gauge nozzle, wherein the output face has at least one of a plurality of hemispherical depressions or a plurality of hemispherical protrusions on the output face.

* * * * *